April 1, 1947.  L. D. OVERLAND  2,418,190
DIPPING APPARATUS FOR COATING ICE CREAM BARS
Filed Oct. 20, 1941  3 Sheets-Sheet 2
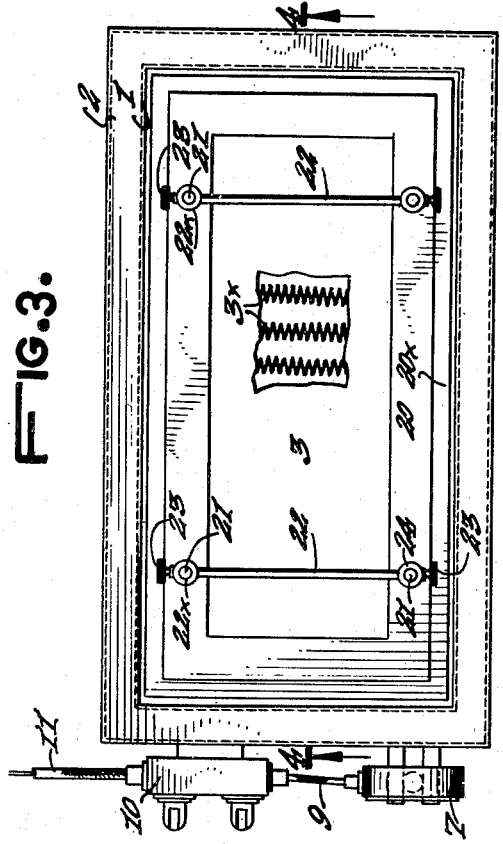
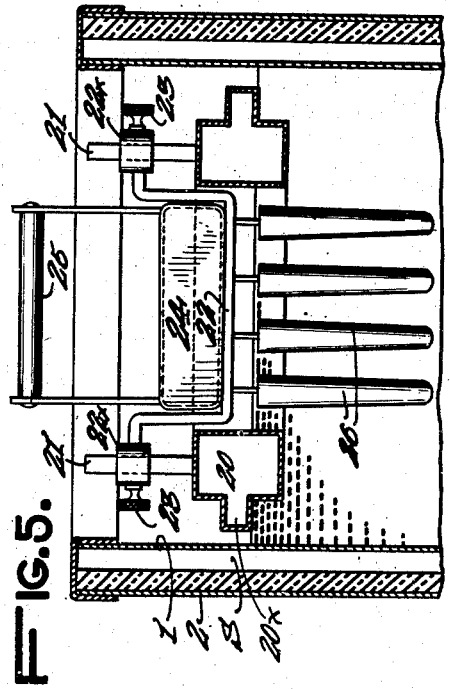
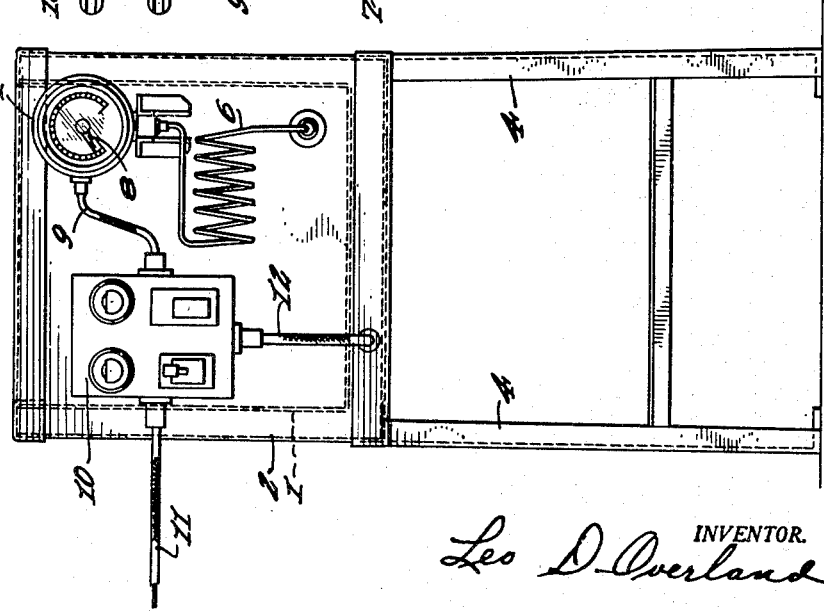
INVENTOR.
Leo D. Overland April 1, 1947.  L. D. OVERLAND  2,418,190
DIPPING APPARATUS FOR COATING ICE CREAM BARS
Filed Oct. 20, 1943  3 Sheets-Sheet 3
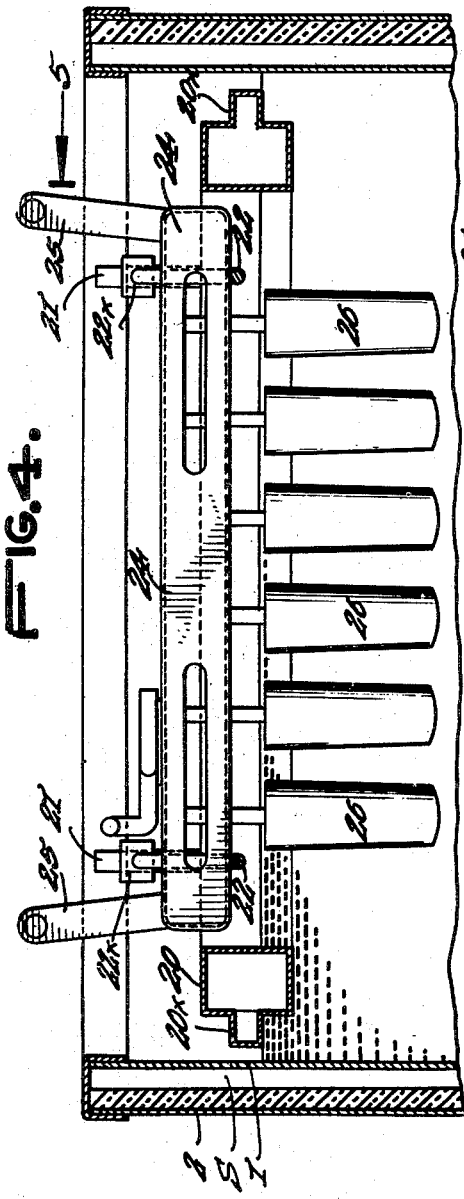
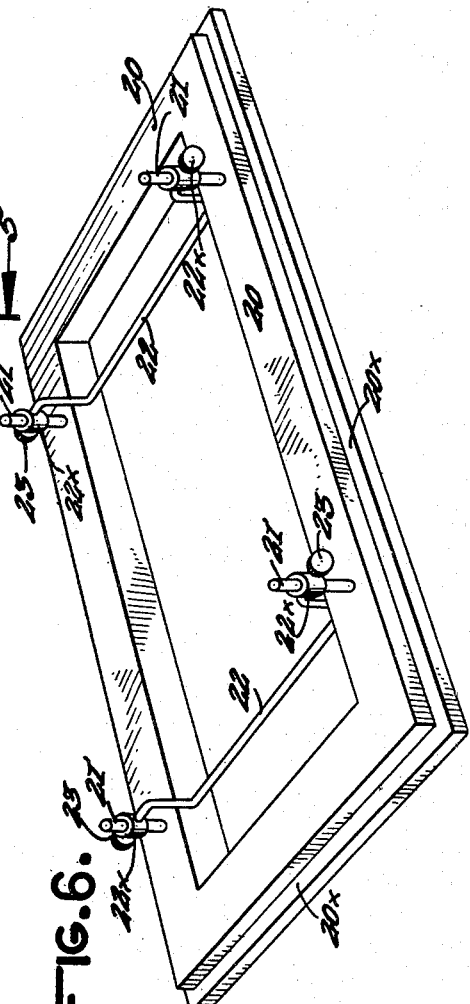
INVENTOR.
Leo D. Overland Patented Apr. 1, 1947

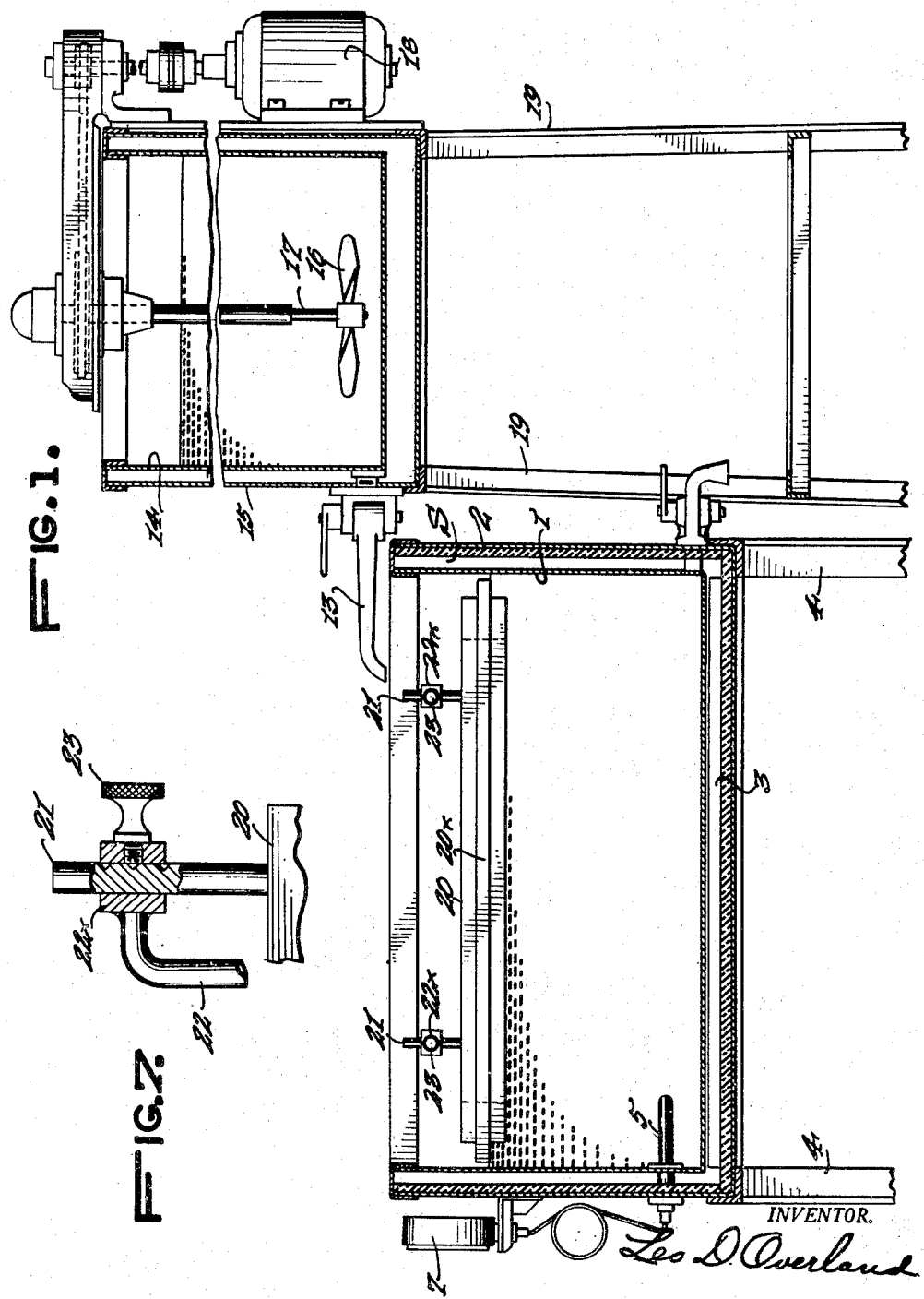

2,418,190

UNITED STATES PATENT OFFICE 2,418,190

DIPPING APPARATUS FOR COATING ICE CREAM BARS

Leo D. Overland, Brooklyn, N. Y.

Application October 20, 1941, Serial No. 415,780

5 Claims. (Cl. 107—54)

The present invention relates to apparatus for use in the hand-dipping of icecream bars or like confection into molten chocolate or similar coating material and it has for its object the provision of means which will automatically insure that the confections will be immersed in the chocolate to a desired point of their length regardless of the gradual lowering of the chocolate content in the dipping tank. These and further objects of the invention will be described with reference to the accompanying drawings in which:

Figure 1 is a sectional elevation illustrating an apparatus constructed in accordance with the invention.

Figure 2 is an end elevation of the dipping tank showing certain electrical controls carried thereby.

Figure 3 is a top plan view of the dipping tank, partly broken away.

Figure 4 is an enlarged fragmentary vertical section on the line 4—4, Figure 3.

Figure 5 is a vertical section on the line 5—5, Figure 4.

Figure 6 is an isometric view of the control float.

Figure 7 is an enlarged detail in partial section of the means for adjustably regulating the height of the stop means carried by the control float.

The apparatus is employed in conjunction with a so-called stick-holder which frictionally holds a plurality of sticks, each carrying a frozen confection. In usual practice, the operator uses the stick-holder as a carrier for the dipping operation. In this operation, he must watch the level of the chocolate in the tank and lowering the confections into the chocolate close watch must be made to stop the lowering action at that point where the chocolate flows into contact with the sticks. In the usual rapid manufacturing operations, it is almost impossible to avoid loss of chocolate due to over-dipping, and a product which is more or less unsightly due to the appearance of chocolate on the sticks above the confections themselves. This is avoided by means of the present apparatus.

Referring to the drawings, I have shown a dipping tank comprising an inner chamber 1 and an outer insulated chamber wall 2, a space at s being provided for further air insulation, but primarily for heated air receiving heat from a heating element 3 below the base wall of chamber 1. In the present embodiment the heating element is electrically energized and embodies resistance wires 3x receiving current from a suitable source of supply. The tank may be supported upon a table frame having legs 4.

The chocolate received within chamber 1 is in hot fluid condition and the normal loss of heat by radiation from the chamber is restored by the heating element 3. This element does not come into action until the temperature of the chocolate is lowered to a predetermined degree. When the temperature reaches the degree a thermocouple switch, diagrammatically indicated at 5, Figure 1, may be employed to establish a circuit through the heating element. However, in the present embodiment, the member 5 is a mercury capsule connected by tubing 6, Figure 2, with a pressure-indicator 7 having a dial and a pointer, the dial being shown at 8. Thus the temperature of the chocolate is translated into terms of pressure and the dial in turn may be a temperature dial. From the pressure-indicator 7 are led the positive and negative wires of a switch (not shown), which switch is thrown into action when the temperature of the chocolate reaches the predetermined degree, said wires being in an insulating sheet shown at 9. These wires lead to a switch box 10 to which current is led by conductors 11 and from which current is led by conductors 12 to the heating element 3. The arrangement is such that when the temperature of the chocolate reaches a certain degree in the action of heating element 3, the pressure of the mercury in capsule 5 will be communicated to pressure-indicator 7 and the switch elements in box 10 will be actuated to open the circuit through the heating element 3.

The dipping tank may be periodically fed molten chocolate through a hand-controlled nozzle 13 communicating with supply tank 14, the latter having a surrounding shell 15 providing a steam jacket for melting the chocolate. A stirring device comprising the stirring element 16 on a shaft 17 driven by suitable connections with motor 18 is preferably employed. The supply tank is shown mounted upon a standard, generally indicated at 19.

Upon the molten cholocate in the dipping tank is placed a float. This float is constructed as a hollow body, rectangular in form, as indicated at 20, the body being provided externally with an intermediate flange 20x which also may be hollow. Each of the longitudinal sides of the float carries two upwardly extending rods 21, and each set of opposed rods has slidably mounted thereon an adjustable U-shaped rod 22. Each rod is carried by a collar 22x slidably mounted upon the appropriate rod 21 and each collar is apertured and threaded to receive a set screw at 23 by means of which the U-shaped rods 22 may be held in adjusted position.

The U-shaped rods 22 provide an adjustable seat for the stick racks, one of the latter being somewhat diagrammatically shown at 24, being provided with carrying handles 25. When a stick-holder carrying rows of stick-held confections 26 is placed upon the adjustable seat arrangement provided by the U-shaped rods 22, the frozen confections will be immersed in the chocolate. The confections, being cold, will immediately solidify a film of chocolate about each one of them and the stick-holder may be immediately removed.

By means of the apparatus, the operator is required only to lower the stick-holder until its base wall strikes the seat members 22 whereupon the operator will immediately lift the stick-holder and frozen confections out of the dipping tank. For confections of relatively short length the seat members 22 may be raised on the rods 21, the required distance, so that the top of the coating as to each confection will be placed exactly as desired.

As the level of chocolate within the dipping tank is lowered, a fresh supply may be passed through nozzle 13 to insure that the depth of chocolate within the tank is at least equal to the length of the confections to be coated. The provision of the flange 20x of the float insures that the float will not be lowered upon contact of the dipping rack with the seat members 22.

Having described my invention, what I claim and desire to secure by Letters Patent is as follows:

1. In dipping apparatus for coating frozen confection bars, and in combination with a tank for holding a liquid coating material and a stick rack for holding frozen confections on sticks, a float device adapted for floating upon the surface of the liquid coating material, said float device having a passageway for the frozen confections and being formed with a lateral projecting flange intermediate the top and bottom walls thereof, and stop means to limit the movement of frozen confections into the coating material, the float descending with the body of the liquid coating material as the height of the latter is lowered in the tank.

2. A dipping apparatus as set forth in claim 1, wherein the flange is at the surface of the liquid before the stop means limits movements of the frozen confections into the coating material.

3. In a process of dip-coating frozen confection bars with projecting individual supporting elements in a molten bath having a floating stop, the steps of grasping a plurality of said elements in a multiple holder in such manner that all of the bars have their ends nearest the holder lying substantially in a common plane below every part of the holder, moving said holder downwardly alongside said floating stop to immerse said bars in said bath until said holder abuts said stop so as to arrest the descent of said holder and thereby gauge the depth of immersion and give an indication that immersion is complete, whereby the bars are fully and quickly, uniformly immersed, regardless of variations in the depth of the bath, and thereupon immediately lifting the holder to raise the bars clear of the surface of the bath.

4. In a process of dip-coating ice-cream bars with projecting individual supporting elements in a molten chocolate bath having a floating stop, the steps comprising mounting an abutment on an element of an ice-cream bar, immersing said bar, element-upward, in said bath alongside said floating stop until the abutment on the element of the bar strikes the floating stop to gauge the depth of immersion and give an indication that immersion is complete, whereby the bar is fully and quickly immersed to a uniform predetermined depth, regardless of variations in the depth of the bath, and thereupon immediately raising the bar clear of the surface of the bath.

5. For use in a unit for dip-coating frozen confection bars, each of which is attached to an individual supporting element, and which unit includes a dipping tank wherein liquid coating material is contained and a multiple holder for detachably grasping said supporting elements in such manner that all of the bars have their ends nearest the holder lying substantially in a common plane below every part of the holder: float means adapted to rest and be buoyantly supported upon the surface of said liquid, said float means being so constructed that said bars can move vertically relative thereto between oppositely disposed portions thereof, and stop means on said float disposed permanently above the surface of the liquid and so arranged as to be abutted directly by said holder upon downward descent thereof before any part of the holder has touched the liquid so that the downward movement of the holder is arrested short of said liquid and to limit the downward descent of said bars upon immersion thereof to shortly beyond said plane so that said bars are barely completely immersed in said liquid, said stop means comprising a plurality of U-shaped members each of which has collars at both its ends and set screws in threaded apertures formed in said collars, said float means having posts extending vertically upwardly therefrom to slidably receive said collars, the set screws serving to clamp the members in vertically adjusted position on the posts.

LEO D. OVERLAND.

REFERENCES CITED

The following references are of record in the file of this patent:

UNITED STATES PATENTS

| Number | Name | Date |
|---|---|---|
| 1,759,964 | Stover | May 27, 1930 |
| 2,015,929 | Goodwin | Oct. 1, 1935 |
| 2,068,326 | Horberg | Jan. 19, 1937 |
| 1,436,560 | Anderson | Nov. 21, 1922 |
| 1,719,524 | Stevenson | July 2, 1929 |
| 1,931,302 | Stover | Oct. 17, 1933 |